Nov. 15, 1960     D. R. CRAIG     2,960,019
PHOTOGRAPHIC PRINTING
Filed June 17, 1957
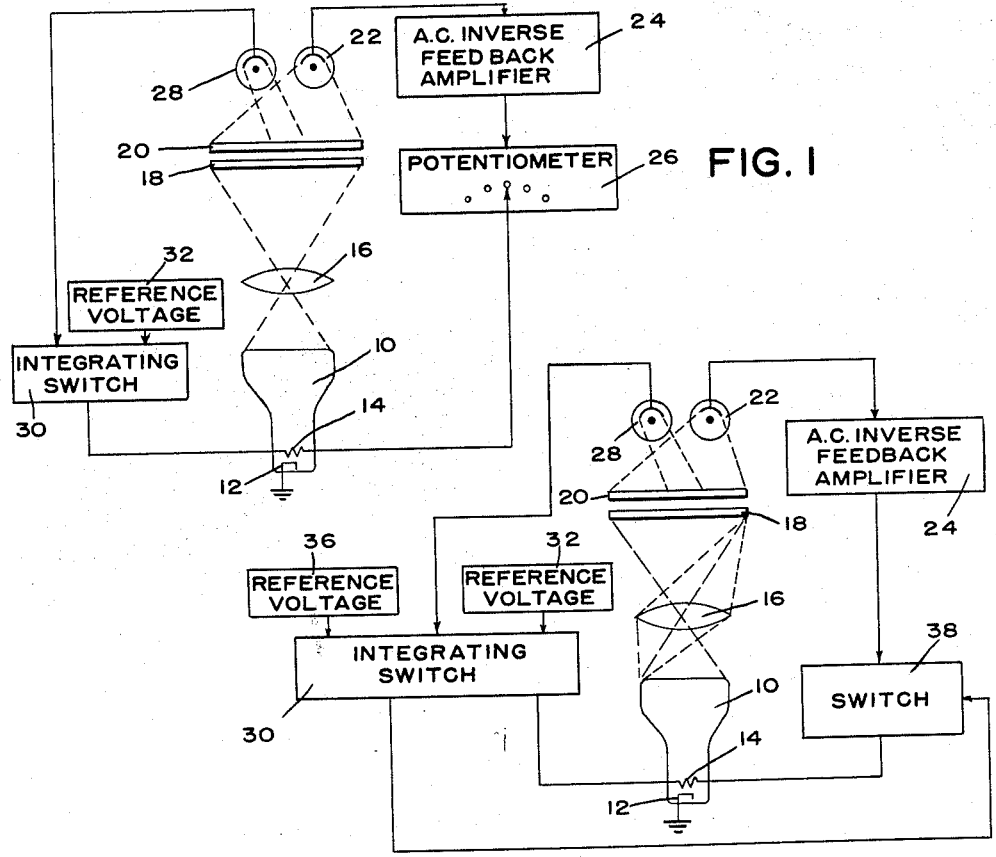
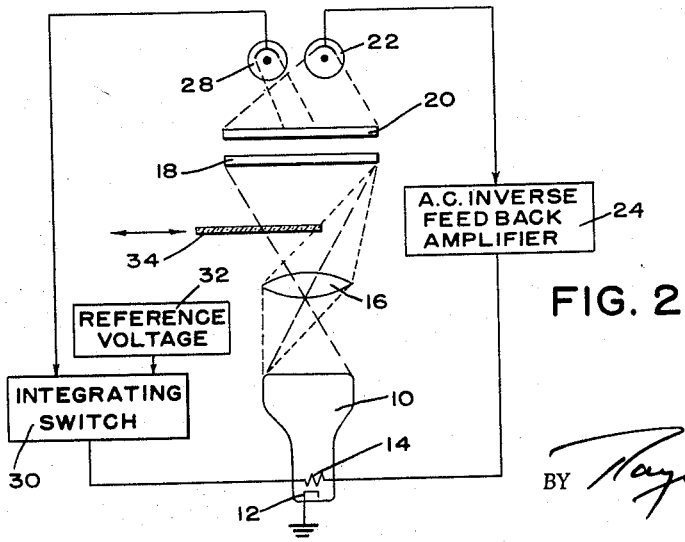
INVENTOR
DWIN R. CRAIG
BY
ATTORNEY

2,960,019
PHOTOGRAPHIC PRINTING

Dwin R. Craig, Falls Church, Va., assignor to Logetronics, Inc., Alexandria, Va., a corporation of Delaware Filed June 17, 1957, Ser. No. 666,123

4 Claims. (Cl. 95—73)

This invention relates to photographic printing and is concerned with methods and apparatus for producing what is known as partial dodging.

The invention is related to photographic printing utilizing a cathode ray tube as the light source in conjunction with inverse feedback from a phototube to a control element of the cathode ray tube to achieve automatic dodging and automatic exposure control of the types set forth in a number of pending applications filed in the name of the present inventor.

Where infinite inverse feedback is employed in such arrangements, any density variations in a negative will be matched precisely by brightness variations of the light produced by the cathode ray tube, completely eliminating any significant variations in brightness sensed by the phototube, and accordingly eliminating any variations in brightness over the surface of the photosensitive material to be exposed by the light emanating from the cathode ray tube. Images thus produced are said to possess zero gross contrast which is defined as density difference between regions larger in area than the spot projected at the transparency. Detail contrast on the other hand, is defined as density differences within regions smaller than the spot projected at the transparency. Prints having zero gross contrast are usually very informative, exhibiting all details which were present in the negative or other transparency. They are not pleasing in appearance however, lacking the aesthetic appeal ordinarily sought in subjective photography. In accordance with the present invention, methods and apparatus have been developed for producing prints which exhibit desirable amounts of gross contrast by the use of partial dodging.

It is among the objects of this invention to provide a photographic printing method comprising energizing a cathode ray tube to direct a light spot of finite area through a transparency on a photosensitive surface to be exposed, sensing the intensity of light to which the surface is exposed, and during an exposure cycle controlling the exposing light impinging on the surface to provide one exposing light component varying over said surface as an inverse function of the sensed intensity, and another exposing light component substantially equally illuminating the entire area of the transparency. In accordance with the forms of the invention contemplated, the components of exposing light may be provided simultaneously or sequentially and the substantially equally illuminating component may be produced optically by diffusion of a portion of the light from the tube or electrically by rendering the control of the tube independent of the sensed intensity. The proportions of the components may be controlled by integrating light to which the surface is exposed, the exposing cycle may be controlled by integrating light to which the surface is exposed and both the exposing cycle and the proportions of the components may be controlled by integrating light to which the surface is exposed.

The invention also contemplates photographic printing apparatus comprising a cathode ray light source having a cathode and control electrode means, support means for a transparency and a photosensitive surface to be exposed in the optical path of light produced by the source, a photoelectric sensing device in the optical path of light to which the surface is exposed, an inverse feedback amplifier in circuit with the sensing device and control electrode means, and control means for varying the local effects of inverse feedback of the amplifier on the surface to provide different degrees of partial dodging. The control means may include an optical diffuser intermediate the source and transparency, a voltage divider intermediate the amplifier and control electrode means, and/or exposing light integrating means and switching means in circuit with the amplifier responsive to the integrating means.

A more complete understanding of the invention will follow a description of the accompanying drawing wherein:

Fig. 1 is a diagrammatic representation of one form of apparatus contemplated;

Fig. 2 is a diagrammatic representation of a modified form of apparatus; and

Fig. 3 is a diagrammatic representation of a third form of apparatus.

With particular reference to Fig. 1, the light source assumes the form of a cathode ray tube 10 including conventional means for producing a scanning electron beam and consequent scanning spot of emitted light and having a cathode 12 and a control electrode 14. Light from the face of the cathode ray tube is projected by a lens 16 through a transparency 18 on the surface of a photosensitized body 20. Light impinging on the photosensitive surface is sensed by a phototube 22 whose output is connected with an A.C. inverse feedback amplifier 24 connected in circuit with the control electrode of the cathode ray tube by means of an attenuator 26 which may assume the form of a potentiometer as diagrammatically shown in Fig. 1. Light impinging on the surface of the photosensitive body 20 is also sensed by a phototube 28 whose output is fed to an integrating switch 30 under the control of a reference voltage 32 to modify the effect of the control electrode 14. The integrating switch may assume various forms exemplified by a capacitor on which a charge is built up until it is sufficient to fire a thyratron which will in turn apply such voltage in conjunction with the reference voltage 32 to the control electrode 14 of the cathode ray tube to terminate the exposure. By selecting the tap of the potentiometer 26 of Fig. 1, the proportion of inverse feedback applied to the control electrode 14 of the cathode ray tube can be varied in definite steps or infinitely so that the light impinging on the photosensitive surface and sensed by the phototube 22 will have a component varying over the surface as an inverse function of the sensed intensity and another component substantially equally illuminating the entire area of the transparency. The phototube 28 is depicted as sampling a local area since its function is to terminate the exposure after a prescribed quantity of light has been directed on the surface.

Inasmuch as the method and apparatus of Fig. 1 are subject to changes in the loop gain due to variables such as the lens aperture, the average negative density, transmission of the material constituting the photosensitive body and collection efficiency between the printing stage and phototube, as well as sensitivity of the phototube, it is desirable to provide methods and apparatus which will be independent of such variables as will be described with reference to the other figures.

In Fig. 2 the dodging loop between the phototube 22 and control electrode 14 contains only the A.C. inverse feedback amplifier 26 so that in this case the overall loop gain can be considered to be infinite so that if other provision were not made, the image produced on the photosensitive material would possess zero gross contrast, or in other words would involve one hundred percent dodging. In this case, the partial dodging is achieved by purely optical means by inserting a diffusing transmitter of light 34 between the lens 16 and the transparency 18. Were this diffuser 34 imposed completely in the light path, the source would behave much the same as though it were an ordinary lamp source. Accordingly, the diffuser 34 will be interposed only partially in the optical path so that the printing plane at the photosensitive surface will be illuminated partially by diffused light passing through the diffuser and partially by the scanning spot from the cathode ray tube which has not passed through the diffuser.

It is interesting to note in this connection that the existence of such diffusing light accounts for two distinct but cumulative effects serving to reduce dodging. One of these effects is purely photographic whereby an undodged component of light is received by the photosensitive surface. The second effect is the apparent reduction in contrast of the transparency to which the phototube 22 is exposed. When the scanning spot encounters a dense area in the transparency, it produces a signal which causes the cathode ray tube to produce more light, but since the brightness of light at the diffuser is directly proportional to brightness of the cathode ray tube, light passing through the thin areas of the transparency by way of the diffuser reaches the phototube 22 to satisfy its demand for additional light. Consequently, the cathode ray tube will never become sufficiently bright in the dense areas of the transparency to produce a completely dodged print. The combination of these two effects, being additive, account for the fact that only a small portion of the lens need be covered by the diffusing material to produce a large reduction in the dodging effect even though the loop gain is for all practical purposes, infinite.

Thus, in conjunction with the form of the invention disclosed in Fig. 2 there is also a component varying over the surface as an inverse function of the sensed intensity and another component substantially equally illuminating the entire area of the transparency.

With reference to Fig. 3, the partial dodging is achieved by providing the separate light components sequentially. The initial portion of the exposing cycle will be effected with one hundred percent inverse feedback, following which there will be an exposure involving no feedback whatsoever. This result is achieved by discontinuing the dodging at some intermediate portion of the exposure. The total exposure will be controlled as in conjunction with the preceding figure to correspond with a predetermined reference voltage 32 based upon the speed of the emulsion of the positive material or photosensitive material employed. In this case, the integrating switch 30, subject to an additional reference voltage 36 serves to operate a switch 38 to discontinue the effect of the A.C. inverse feedback amplifier after a predetermined quantity of light has been sensed by the phototube 28. Inasmuch as the reference voltages 32 and 36 are adjustable, the total exposure can be varied in connection with Fig. 3 as well as Figs. 1 and 2, and the portion of the exposure during which dodging occurs can also be varied. Accordingly, with apparatus of the type shown in Fig. 3, the degree of dodging can be varied infinitely between zero and one hundred percent. Thus, with the apparatus and method involving Fig. 3 also, there is one component of exposing light varying over the photosensitive surface as an inverse function of the sensed intensity and another component substantially equally illuminating the entire area of the transparency.

Whereas only three forms of the invention have been described by way of example, the invention should not be restricted thereto beyond the scope of the appended claims.

I claim:

1. Photographic printing apparatus comprising a cathode ray light source having a cathode and control electrode means, support means for a transparency and a photosensitive surface to be exposed in the optical path of light produced by said source, a photoelectric sensing device in the optical path of light to which said surface is exposed, an inverse feedback amplifier in circuit with said sensing device and control electrode means, and control means proportioning light from said source into a component of positive value and an alternating inverse feedback component for varying the local effects of inverse feedback of said amplifier on said surface to provide different degrees of partial dodging.

2. Photographic printing apparatus as set forth in claim 1 wherein said control means includes an optical diffuser occupying a portion only of the light path intermediate said source and transparency.

3. Photographic printing apparatus as set forth in claim 1 wherein said control means includes a voltage divider intermediate said amplifier and control electrode means.

4. Photographic printing apparatus as set forth in claim 1 wherein said control means includes exposing light integrating means and switching means in circuit with said amplifier responsive to said integrating means.

References Cited in the file of this patent

UNITED STATES PATENTS

| | | |
|---|---|---|
| 2,186,942 | Vierling | Jan. 16, 1940 |
| 2,543,706 | Pohl | Feb. 27, 1951 |
| 2,553,421 | Monsen | May 15, 1951 |
| 2,757,571 | Loughren | Aug. 7, 1956 |
| 2,804,498 | Theile | Aug. 27, 1957 |

FOREIGN PATENTS

| | | |
|---|---|---|
| 713,285 | Great Britain | Aug. 11, 1954 |